March 8, 1960　　R. O. JORDAN ET AL　　2,927,963
SINGLE CHANNEL BINAURAL OR STEREOPHONIC SOUND SYSTEM
Filed Jan. 4, 1955　　　　　　　　　　　　　　3 Sheets-Sheet 1

INVENTORS.
Robert Oakes Jordan
James Cunningham
By: Brown, Jackson, Boettcher & Dienner
Attys.

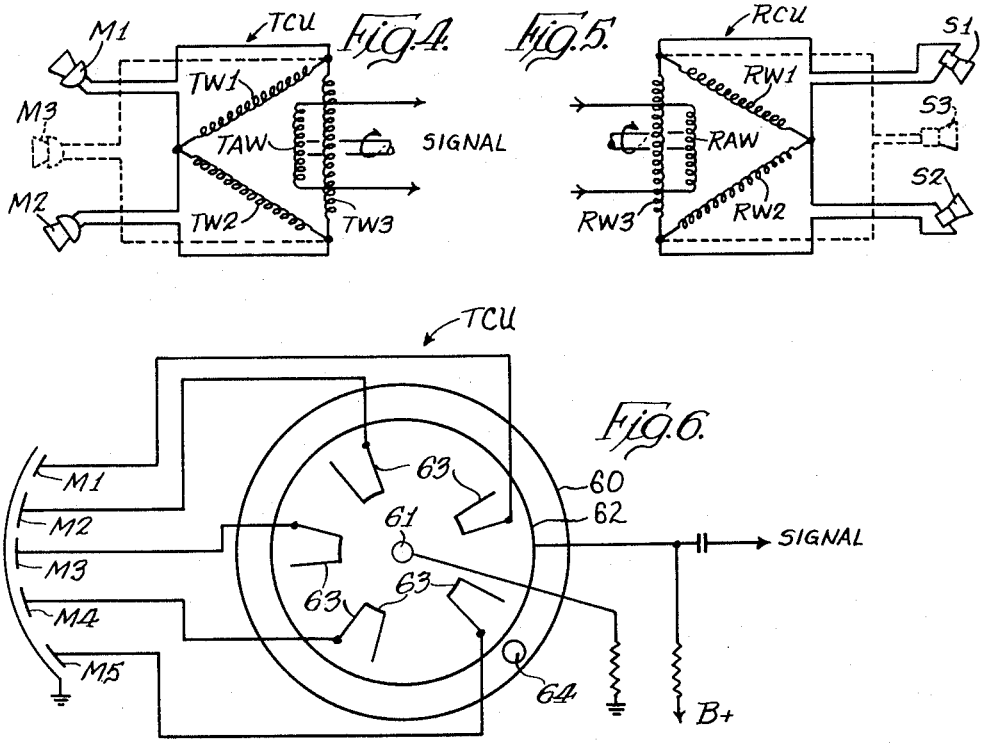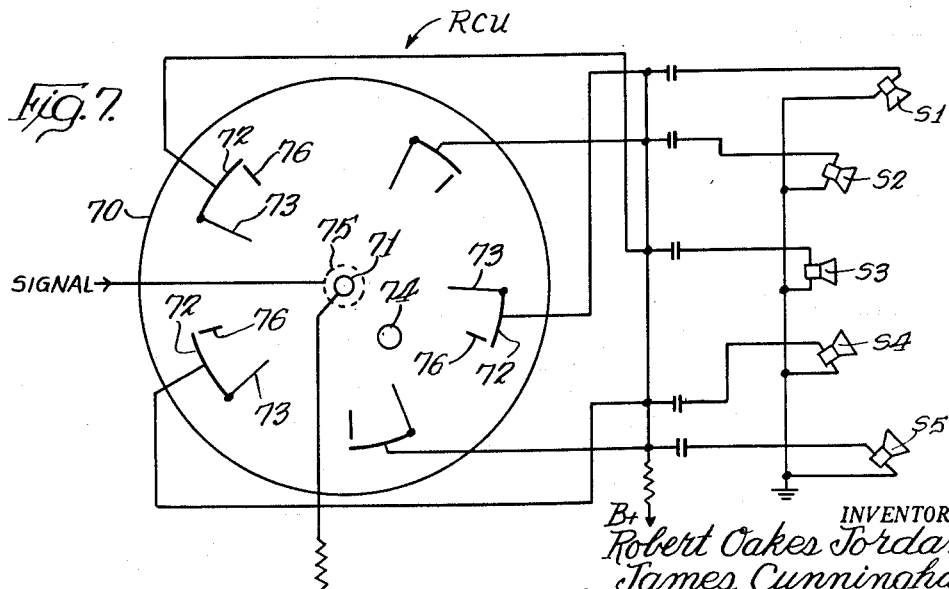

March 8, 1960 R. O. JORDAN ET AL 2,927,963
SINGLE CHANNEL BINAURAL OR STEREOPHONIC SOUND SYSTEM
Filed Jan. 4, 1955 3 Sheets-Sheet 3
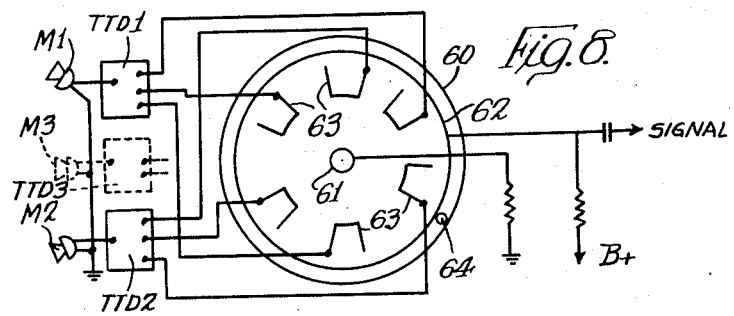
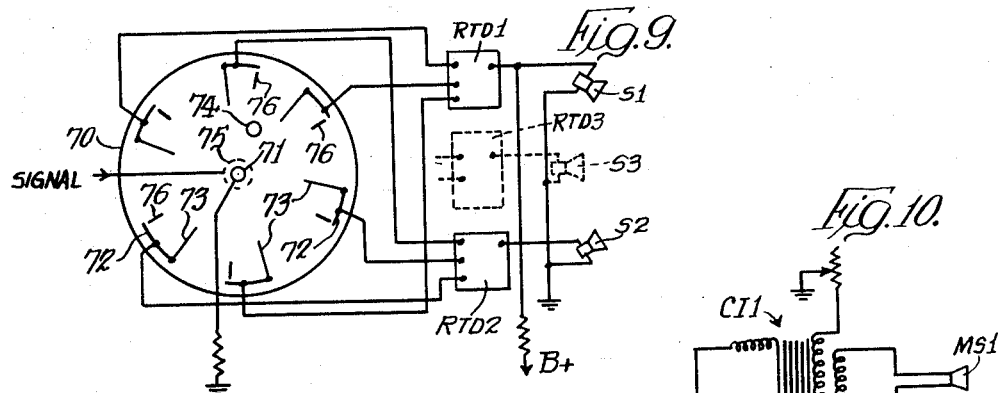
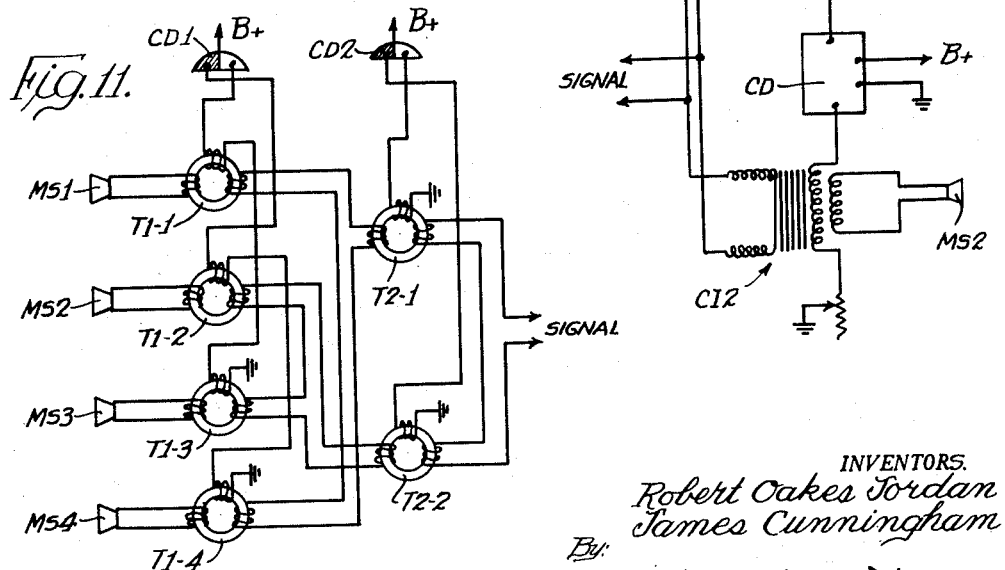
INVENTORS.
Robert Oakes Jordan
James Cunningham
By:
Brown, Jackson, Boettcher + Dienner
Attys

United States Patent Office 2,927,963
Patented Mar. 8, 1960

2,927,963

SINGLE CHANNEL BINAURAL OR STEREO-PHONIC SOUND SYSTEM

Robert Oakes Jordan and James Cunningham, Highland Park, Ill., assignors to Robert Oakes Jordan, James Cunningham, and Robert S. Groetzinger, Highland Park, Edward Marker and Stanley Stoltz, Chicago, Thomas R. Juettner, Des Plaines, and John J. Cassidy, Jr., Chicago, Ill., a partnership Application January 4, 1955, Serial No. 479,782

1 Claim. (Cl. 179—1)

The present invention relates to stereophonic or binaural sound, and particularly, to methods and apparatus for the transmission, recording, reception and reproduction of stereophonic or binaural sound via a single channel.

Voluminous works have been published concerning the ability of the human hearing system to perceive the location, direction of movement and scope of single and multiple source and single and multiple frequency sounds, and to segregate one source or frequency from others. Essentially, the human hearing system affords these capabilities due to the spaced duality of the ears and associated sensory organs and nerves, which perceive differences in intensity, time and quality of sound transmitted to the respective sub-systems, in conjunction with a complex nerve center which, subject to conditioning through experience, dictates movement of the head in an endeavor to eliminate differences between the respective perceptions of the ears, whereupon the head focusses upon the sound. Of course, additional factors enter into consideration, but it is adequate here to say that the completeness of sound perception by the human system is attained by two ears, that is, binaurally. If, on the other hand, only one ear of the human system is effective, sound then being perceived monaurally, the capabilities of the system are vastly impaired.

Commercial radio and television sound, for the most part, is transmitted and received monaurally, and commercial recordings, of the disc, tape and wire types, likewise for the most part, are monaural. Irrespective of the number of speakers employed at the receiving or reproducing end, the sound reproduced is monaural, and definitely inferior to live performances. It has long been an object of the art to afford more life-like sound reproduction, and particularly, to accommodate the transmission, recording, reception and reproduction of sound binaurally. Since, binaural perception affords humans a completeness of sound, endeavors to recreate or reproduce an audibly complete sound have become known as binaural or stereophonic systems. To the present, successful endeavors in the direction of binaural or stereophonic systems have been multiple channel systems. In radio and television, two separate channels, AM and/or FM, have been employed, one for the transmission of one physical half of the sound stage and another for the other half. In recordings, discs with two grooves, and dual track magnetic tapes, are available on the market for use in conjunction with special, and complicated, dual head or bifurcated pickup units. In the motion picture industry, multiple sound tracks have been provided on film, each reproducible over separate speakers through separate reproducers and amplifiers. Multiple channel systems, however, are too expensive and complex, and too demanding technically, to render binaural or stereophonic transmission and reception commercially feasible, or to make binaural or stereophonic recording and reproduction available to other than a very small percentage of the consuming public. To mitigate the expense involved, and substantially to eliminate the complexity and technical demands of multiple channel systems, numerous proposals have been made in an endeavor to attain a single channel system for the transmission, recording, reception and reproduction of binaural or stereophonic sound. However, these prior proposals have failed to provide a practical single channel system for this purpose.

It is an object of the present invention to provide an improved system for the single channel transmission, recording, reception and reproduction of sound binaurally or stereophonically, which system is economical in its methods and apparatus, fully practical and commercially feasible, and capable of creating or reproducing complete sound to the binaural perception of the listener.

It is also an object of the present invention to provide improved methods and apparatus for the transmission, recording, reception and reproduction of binaural or stereophonic sound via a single channel.

A further object of the invention is the provision of a single channel stereophonic or binaural sound system that is completely compatible both to monaural and binaural or stereophonic reception or reproduction.

As is known, the human mind or intellect retains a sound for a given time interval after the sound has ceased. The present invention takes into regard and relies upon the retentiveness of the mind for sound, and employs apparatus and methods which operate in relation to the retentiveness of the mind to emit from a sound source, such as a loudspeaker, individually distinct sounds at such frequency that the human mind perceives only a constant emission from the sound source or speaker. Then, by imparting spatial relationship to the speaker means and emitting at spaced points the sound perceived at related points in a live sound stage, all at a frequency outside or beyond human perception, the human mind through the hearing system perceives the simultaneous and constant emission at spaced points of sounds of different character (as reproducing the space intervals of the live sound stage), thus recreating in the mind the complete original live sound stage, with locations of audible prominence and directions of movement. The first, and a novel step in the method of the invention comprises sweeping the sound stage, that is, all of the sound sources involved, with microphone means so as to pick up at spaced points, the sound components existent at the various points. The sound picked up at each point, of course, is predominatly that emitted from the sound sources present immediately adjacent that point, with lower intensities of the sound emitted from source in the adjoining areas. By constantly sweeping the sound stage at a frequency outside or beyond human perception, a single output signal is attained which represents in order the sound source components at each of the pick-up points. Since the sweeping is not audibly perceptible, the signal may be received and reproduced monaurally in conventional manners, the individually dominating sounds when emitted from speaker means blending to human perception in a harmony of sound that in most cases should be at least somewhat more full than conventional monaural broadcasts and recordings. To reproduce binaurally or stereophonically the single signal output of the microphone means, a second novel step in the method of the invention is to sweep speaker means in a path corresponding or complementary to the sweep path of the microphone means, and preferably synchronously with the microphone means, whereby the speaker means is located synchronously at least at the spaced points of pick-up of the microphone means to reproduce at the respective spaced points the predominant sound sources or the transmitted sound source components of the live sound stage. Since the sweeping is, as noted, beyond human perception, with the interval between individual sound emissions at each point less than the retentive interval of the mind, the hearing system and mind perceive the constant, simultaneous emission of the predominant sources at the respective points. These predominant sounds, of course, blend into a harmonious whole, as in monaural reproduction, but by sweeping the speaker means in space, the spatial relationship of the original sound stage is reintroduced, whereby the completeness and dimension of the live sound stage is reproduced to the perception of the human system, individual sounds have spatial location in the reproduced stage, and areas of audible prominence and directions of movement are truthfully reproduced.

Further according to the present invention, the sweeping of the live and reproduction sound stages is preferably effected electrically or electronically in conjunction with a plurality of stationary microphones disposed in spaced relation in the area of the live sound stage and a plurality of spaced speakers at the area of reproduction. The present invention further affords as one of its objects the novel accomplishment of a true sweeping function by constant energization and controlled attenuation of the microphone or speaker units in the sound stage and reproduction areas. Specifically, the units in each area are all energized and all but one are attenuated to the audible perception of the human system, whereby the unattenuated unit predominates over the attenuated units. Sweeping is effected by unattenuating the units in a given order, with all but one of the units being attenuated at any given instant. Such sweeping control, which will be described in greater detail hereinafter, insures a true sweeping of the respective area, eliminates the problems of previous proposals with respect to speed of operation, noise, E.M.F. factors, intelligibility, and transmission, and affords true binaural reception and reproduction.

In addition to the foregoing, it is among the objects of the invention to afford novel sweeping control means including the principles of audible attenuation by intensity variation and a novel principle of audible attenuation or relocation by time delay.

A still further object of the invention, and of distinct advantage, is the provision of improved methods and apparatus affording a single channel binaural sound system which is not only compatible to existing radio and television, and recording and reproducing apparatus, but which also renders the conversion of conventional monaural transmitters, recorders, receivers, and reproducers, to accommodate binaural sound, highly economical and fully practical by the simple expedient of an attachment device and one or more additional microphones or loud speakers.

Other objects and advantages of the present invention will become apparent in the following detailed description of preferred embodiments of the invention.

Now, in order to acquaint those skilled in the art with the manner of making and using the apparatus of the invention and practicing the methods of the invention to carry to fruition the single channel system provided by the invention, we shall describe, in connection with the accompanying drawings, certain preferred embodiments of the apparatus of the invention, from which the methods and system of the invention will become fully apparent.

In the drawings, wherein like reference characters indicate like parts:

Figure 4 is a circuit diagram of suitable control means, in the form of a selsyn, or the like, for controlling sweeping of microphone means;

Figure 5 is a circuit diagram of control means for controlling sweeping of speaker means, the control means being particularly adapted for use in conjunction with the control means of Figure 4;

Figure 6 is a circuit diagram of sweep control means provided according to the invention for a plurality of microphone means at the transmitting or recording end of the system, the control involving intensity attenuation;

Figure 7 is a circuit diagram of sweep control means for a plurality of loud speakers at the receiving or reproducing end of the system, the control involving intensity attenuation and being particularly adapted for use in conjunction with the transmitting or recording control of Figure 6;

Figure 8 is a circuit diagram of sweep control means provided according to the invention for a plurality of microphone means at the transmitting or recording end of the system, the control involving audible attenuation by time delay;

Figure 9 is a circuit diagram of sweep control means for a plurality of loud speakers at the receiving or reproducing end of the system, the control involving audible attenuation by time delay and being particularly adapted for use in conjunction with the transmitting or recording control of Figure 8;

Figure 10 is a circuit diagram of sweep control means for a plurality of either microphones or loud speakers, the control involving audible attenuation attained by controlled inductance; and Figure 11 is a circuit diagram of sweep control means for a plurality of either microphones or loud speakers, the control involving audible attenuation attained by saturable transformer or reactor units.

Figure 1:
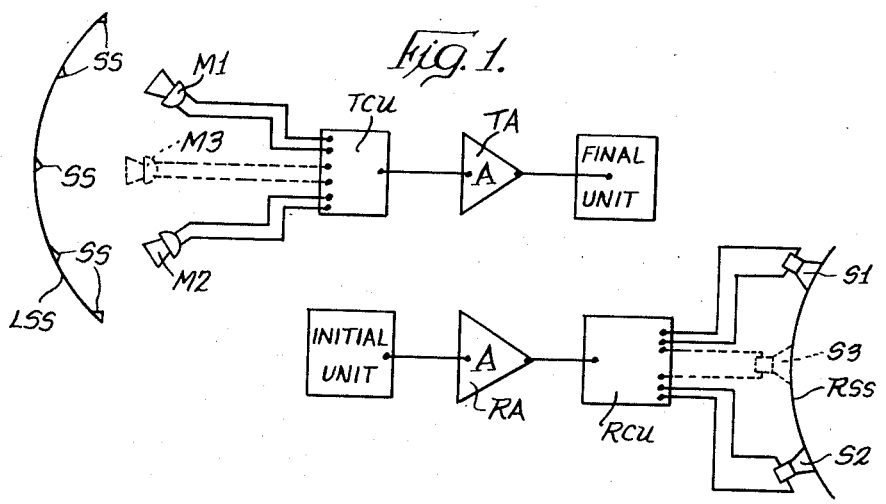
Figure 1 is a block diagram of complete transmitting or recording and receiving or reproducing systems suitable for practice of the present invention.

Before proceeding to a detailed consideration of the disclosed embodiments of the invention, a glossary of terms used herein is appropriate. The words transmission and transmitter are intended to include customary and proposed form of and apparatus for short wave, high frequency and ultra high frequency transmission of sound impulses, for wireless AM and FM, radio and television sound transmission. Recording and recorder are intended to encompass all forms of and apparatus for making a sound record, mechanical, magnetic and photographic, on wax, film, metal and other materials, on cylinders, discs, felts, film, tapes and wires. More specifically, recording, as used herein, is intended to encompass single track or single channel recordings, not the multiple track or groove binaural recordings and film sound tracks presently available. Reception and receiver include the conventional methods and apparatus of AM, FM, radio and television receivers of wireless sound transmission for recreating the audible sounds transmitted. Reproduction is intended to encompass the playing back of records or recordings, within the above definition of those words. Reproducer is intended principally to define record play back apparatus, such as phonographs, transcribers, the play back portions of wire and tape recorders, the play back means of film sound tracks, and the like. The word microphone is intended to encompass all forms of sound pick-up devices capable of translating sound waves into mechanical vibration, electrical energy, or the like, and includes single and multiple element microphones, which in the practice of the invention normally will be directional. Speaker is intended to include all forms of devices for translating mechanical vibration, electrical energy, or the like, into audible sound, such as loudspeakers and ear phones. Generally, the term loudspeaker, at least in those instances wherein only two loudspeakers are employed, also includes ear phones. Microphones and speakers are both included in the term translating means, as translating sound to another form of energy, or translating one form of energy to sound. Monaural includes all forms of monaural sound transmission, recording, reception and reproduction, irrespective of the number of microphones and/or speakers employed, it also includes the "pseudo-stereophonic" effects for example, that utilized in the ultraphone wherein identical sound is emitted from two speakers with time delayed emission from one speaker. In some quarters, binaural sound is popularly defined as the reproduction by ear phone of two channel binaural recordings, one channel in each ear phone, and stereophonic reproduction is defined as reproduction of multiple track recordings by loudspeaker. As used herein, sterophonic and binaural are substantially synonymous and properly referred to the transmission, recording, reception and reproduction of the whole sound perceivable by the binaural human system, complete with spatial relationship, dimension and scope, and spatial location and direction of movement of individual sounds. Sound stage is intended to encompass the entirety of an area in which sound is to be audibly perceived, for example, the area occupied by an orchestra, the live sound stage being the actual location of the sound to be picked up and transmitted or recorded, and the reproduced or reproduction sound stage being the area in which the transmitted or recorded sound is to be received or reproduced. A sound stage may have horizontal and/or vertical extension, but herein reference is made principally to horizontal extension, application of the invention to vertical, or horizontal and vertical, extension being obvious from such reference. Sound source is then intended to define the individual sources of sound in the sound stage, for example, the individual instruments in an orchestra; and channel is intended to encompass the sound track of all forms of sound transmission or recording, such as the frequency channel of an AM or FM broadcast, telephonic communication, the groove in wax recordings, the magnetic sound track on wire, tape and magnetic disc recordings, and the optical sound track on film.

Referring now to the drawings, and particularly to Figure 1, we have represented, schematically and by blocked diagram, apparatus suitable for practice of the invention. As shown, a sound stage, assumed to be a live sound stage, such as the area occupied by an orchestra, is indicated by the arcuate line LSS, the same being comprised of one or more individual sound sources, as indicated at the pips SS, disposed or located in a spatial setting. To perceive or pick-up the live sound stage, the apparatus of the invention includes, at the transmitting or recording end, microphone means, such as microphones M1, M2 and M3. Theoretically at least, a single microphone could be utilized. However, it is preferred according to the invention that at least two, and in some cases more than two, microphones be employed in spaced relation on the sound stage. For this reason, microphones M1 and M2 have been shown in solid lines to indicate the minimum preferred requirement, and microphone M3 has been shown in dotted lines to indicate the employment of as many additional microphones as may be desired. The microphones are disposed in spaced relation along the sound stage in the same manner as has become conventional in multiple channel binaural sound transmission and recording. Each of the microphones is electrically connected to a control means or control unit TCU, which unit has a single channel signal output, here indicated by a single line, to a conventional amplifier TA and a suitable final unit, which may be a transmitter, for AM or FM radio, for example, or a recording device, such as a tape recorder or the like. The final unit also has a single channel output, whether that be a single radio frequency channel, or a single sound track on a record. As will be appreciated, the apparatus disclosed comprises the usual or customary recording or transmitting apparatus, with the exception of the addition of the control unit TCU, and where necessary, the addition of microphone means.

To recreate the sound stage LSS at another location, receiving or recording apparatus is provided according to the invention, the same comprising, in the first instance, an initial unit. This initial unit may, in the case of the said final unit being a transmitter, be a radio receiver, or may, in the case of said final unit being a recorder, be a record player or reproducer, for receiving and/or recreating the single channel signal output of the control unit TCU. The recreated signal is fed to a conventional amplifier RA and from thence to a control means or control unit RCU, to which speaker means, such as the speakers S1, S2 and S3, are connected. Generally, the number and placement of loudspeakers is the same as that of the microphones. If ear phones are employed, two ear phones, one of each ear of the listener, are employed. In either case, the speakers are disposed, as is known, to recreate or reproduce the original or live sound stage, herein indicated by the line RSS for loudspeakers.

As will become more fully apparent hereinafter, the purpose of the control unit TCU at the transmitter or recorder end is to cause the microphone means to sweep the sound stage LSS to pick-up components of the total sound at spaced points or locations on the sound stage, first picking up sound at one location, then at another, and so on, as though a microphone were moved or swept continuously across the sound stage. At each point or location of perception, the microphone means picks up components of the total sound consisting predominantly of the sound sources immediately adjacent that point with under tones or distance attenuated intensities of the sound sources in adjoining areas. These components are then combined in an ordered arrangement to constitute a single output signal. As will be discussed in greater detail, sweeping of the sound stage LSS must take place at a frequency such that the interval between corresponding sound components, i.e., those taken from a common point, at least is not substantially greater than the interval of sound retention by the human system. With the control unit TCU performing this function, a single channel signal is fed from the control unit to the final unit. This signal is then recreated or received in the initial unit of the receiving or reproducing apparatus, amplified, and fed to the control unit RCU. The purpose of the control unit RCU is to sweep the reproduction sound stage RSS with speaker means in such manner as to effect emission of corresponding sound components of the single signal at respective points or locations on the stage RSS corresponding, preferably, to the location of pick-up on the original stage LSS. This preferably, but perhaps not necessarily, is accomplished by sweeping the reproduction stage with speaker means synchronously with the sweeping of the live stage with microphone means. For this purpose, the circuit means of the sending and receiving apparatus may, where deemed necessary, include such synchronizing means as may be desired. A wide variety of means for affording synchronous operations are known to the art and may be readily employed in known manners in the apparatus and systems of the method, and accordingly, are not shown and described herein. As the speaker means thus sweeps the reproduction stage RSS, sound components of different character, as comprised of different dominating sound sources, are emitted at spaced points to impart or reintroduce the spatial relationship of the sound sources on the live sound stage LSS. At each location of sound emission, corresponding components of sound are emitted at intervals at least not substantially greater than the interval of sound retention of the human system so that a human listening to the emitted sound perceives only a constant emission. At the same time, constantly perceived emissions are emitted at other and spaced locations in such manner that the human system cannot audibly perceive the sweeping being effected. Thus, the human system perceives the simultaneous, constant emission at spaced points of different components of a complete sound, whereupon, as is known from multiple channel systems, full, binaural or stereophonic, sound of the live sound stage is recreated or reproduced with the scope and dimension, spatial location and movement of a live performance.

Figure 2:
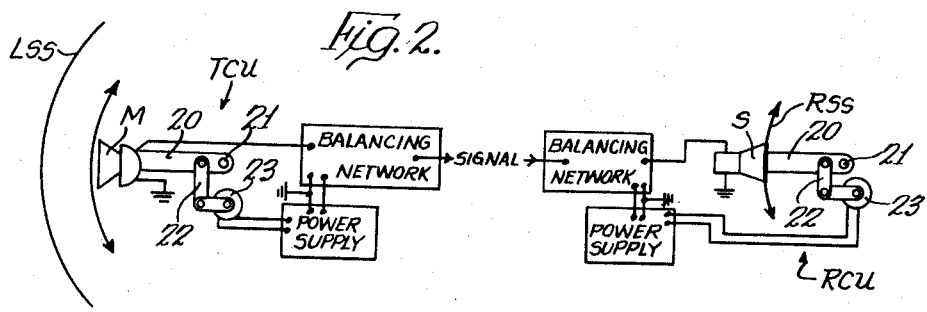
Figure 2 is a schematic representation of apparatus which embodies the broad principles and theories involved according to the invention in the pick-up and reproduction of binaural or stereophonic sound.
Figure 3:
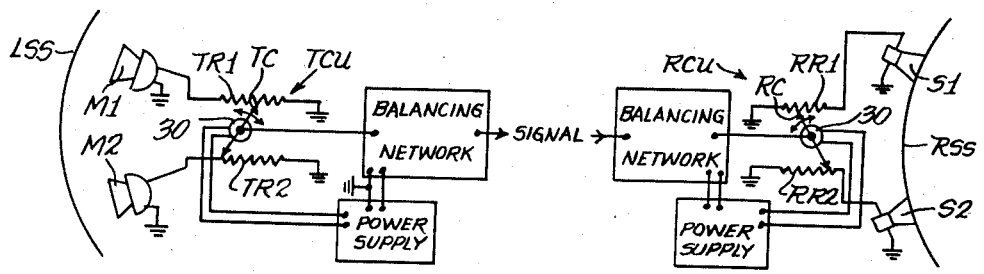
Figure 3 is also a schematic representation of apparatus which embodies the broad principles and theories of the present invention.

The effect and purpose of the sound stage sweeping steps in the method of the present invention are best understood, at least in theoretical aspect, from Figures 2 and 3, Figure 2 disclosing mechanical means for physically sweeping the sound stage with translating means, that is, microphone and speaker means, and Figure 3 showing schematically electrical or electronic means in conjunction with a plurality of translating means for sweeping the sound stages to simulate, and in practical effect to attain, physical sweeping of the stages. Referring to Figure 2, we have shown, at the transmitting or recording end of the system, a directional microphone M mounted on one end of an oscillatable arm 20 which has a fixed pivot 21 at its opposite end, the arm being oscillatable by means of a conventional crank connection 22 between the arm and an electric motor 23. The microphone M is grounded at one terminal and connected at its other terminal to a balancing net work, the net work and motor being energized from a suitable power source. In terms of the present invention the balancing net work and microphone oscillating mechanism 20, 21, 22, 23 would comprise the transmitter or recorder control unit TCU. At the receiving or reproducing end, the control unit RCU is comprised of identical units, as is indicated by the same reference numerals as above employed. At the transmitting end, the directional microphone M is disposed to define, when oscillated, a convex arc concentric with the arc of the sound stage LSS, and at the receiving end, the speaker S, mounted on the oscillation arm 20, is mounted to define, when oscillated, a concave arc RSS complemental to the arc of movement of the microphone M to recreate or reproduce along the arc the live sound stage. Of course, it is to be understood that the representation of physical apparatus in this figure is not necessarily for the purpose of disclosing a practical embodiment of the invention, but principally for the purpose of describing the theoretical effects and purposes of the invention. The motors 23 employed suitably could be synchronous motors to drive or oscillate the microphone M and speaker S synchronously.

As thus oscillated, the microphone M sweeps back and forth across the live sound stage LSS. Being directional, the microphone picks up at each point in its sweep path the predominant components of the total sound located in the immediate area of the respective point. Nevertheless, the microphone emits only a single signal, which signal, as is obvious, will comprise an ordered arrangement of the respective components of the total sound. In this respect, it is to be observed that at each point in its sweep path, the microphone somewhat simulates a single human ear in that it will tend to perceive predominantly those sound sources located in its directional beam of sensitivity or perception. However, it will also perceive other sounds which exist within the general area of its being. For example, if the microphone is at one limit of its sweep path and is being utilized to pick up orchestral music, the microphone will perceive predominantly those instruments located adjacent that end of the stage, say the bass strings. However, the sound of other instruments will also exist within the area occupied by the bass strings, for example, if the violin section is located immediately to that side of the center of the stage to which the bass strings are located, the strident voice of the violins will also be heard, but the perception of the violins will be attenuated with respect to their actual intensity by the distance involved. Accordingly, if all instruments were actually played with equal intensity, the microphone would perceive predominantly the instruments in the immediate area and lesser intensities of the other sound sources, the intensity of the other sound sources diminishing in accordance with their distance from the microphone. Thus, at each point, the microphone tends to perceive that which a human ear would perceive, not merely isolated sound sources. Accordingly, as the microphone sweeps the sound stage, it does not merely perceive in consecutive order the individual sound sources on the stage, but perceives all of the various components of the total sound at each point in its path, so that the signal emitted consists of an ordered arrangement of all of the different components of the total or complete sound of the sound stage, the arrangement being the order in which the various components are encountered in the sweep path of the microphone.

The signal thus emitted by the microphone M may be recorded in any conventional manner and/or may be directly transmitted in customary manners. To recreate the live sound stage at another location, the said signal is reproduced or received in a conventional manner, amplified, and fed to a speaker S. As above noted, the speaker S is caused to sweep a reproduction sound stage RSS, preferably at the same speed as and synchronously with the sweeping of the microphone M. The speaker S translates the signal into sound and emits the various sound components at points on the reproduction sound stage corresponding to the points of perception by the microphone on the live sound stage, whereby the speaker S emits the total sound perceived by the microphone in substantially the same spatial relation as the sound was perceived by the microphone. In other words, each physically spaced sound component of the live sound stage is reproduced in corresponding locations on the reproduction sound stage. Thus, each instrument or sound source of the orchestra, or original or live sound stage, is recreated in its original placement on the reproduction sound stage. Obviously then the reproduction is truly binaural or stereophonic, complete with the scope, dimension, spatial relationship and location of the original sound sources.

To attain true binaural reproduction, it is necessary that the human hearing system perceive a constant emission sound from each point on the sound stage. The human system enjoys certain characteristics, among which is the ability to retain sounds for a given time interval, the capabilities of the human system in this respect being well known. For example, it has been reported scientifically that the human system will retain a sound for 50 milliseconds (.050 second), as an average, after cessation or abrupt cut-off of the sound. Whether or not this is a completely accurate figure is not of prime importance herein, only the fact of the existence of a retentive period being necessary.

In view of this fact, and assuming the decay time interval stated to be fairly accurate, we conceive that if a given sound were emitted in interrupted fashion at intervals of less than 50 milliseconds (.050 second) from a given source, the human system could perceive only a constant emission of the sound from that source. Further, if a sound were to be emitted in interrupted fashion for a substantial period of time from a given source, conditioning of the human system to the expected would permit of interrupted intermission at intervals up to and probably somewhat beyond 50 milliseconds (.050 second) without the human system perceiving other than a constant emission. While we prefer to work within an interval less than the full decay interval, we appreciate the possibility of working within an interval greater than the normal decay interval, provided that the working interval be not substantially greater than the decay or retentive interval of the human system. Applying this concept to the apparatus shown in Figure 2, we propose to sweep the translating means M and S at a frequency or speed such that the time interval of a complete oscillation, that is a full back and forth movement, is not substantially greater, and is preferably less, than the sound retention interval of the human system. For example, as shown in Figure 2, both the speaker S and microphone M would be moved from the lower limit of the respective path to the upper limit and back to the lower limit in a time interval preferably less than .050 second. Thus, at intervals of less than .050 second all along the arc of movement of the speaker S, corresponding components of the total sound signal would be emitted at respective points, whereby at each point, a listener could perceive only a constant emission of the respective component. Accordingly, the listener would perceive the total sound spread across the sound stage, with each of the sound sources located in positions on the reproduction sound stage corresponding to the actual location of such sources on the live sound stage. Because of this, it is to be appreciated that the sound stage sweeping steps of the invention are imperceptible to the human audible system, or are carried out at a frequency outside of or beyond audible perception.

It is, of course, appreciated that the speed of sweeping poses substantial problems in a mechanical system of the character schematically represented. Among the problems that could be expected would be problems of mechanical speed of movement of the translating means, wind and velocity effects on perception and emission, possible Doppler effects, and so on. Generally speaking, the balancing net works in the arrangement disclosed would serve to eliminate wind, velocity and Doppler effects. In theory, the apparatus of Figure 2 aptly illustrates the principles, purposes and effects of the present invention. Further, a physical sweeping of the sound stage, if possible, would most likely afford the best results, because the microphone means would be sensitive to an infinite number of pick-up points on the live sound stage and the speaker means would exactly reproduce the sound at an infinite number of corresponding points on the reproduction sound stage to duplicate the live sound stage to the greatest extent possible.

However, because of the problems inherent in a physical sweeping of translating means across a sound stage, we prefer to employ in the practice of the invention a plurality of stationarily located translating means in conjunction with control means for electrically or electronically causing the translating means effectively to sweep the sound stage. The theories of this system of operation are best described in conjunction with a simple electro mechanical set-up, such as schematically illustrated in Figure 3. At the transmitting or recording end, as shown, at least two microphones M1 and M2 are disposed in spaced relation along the live sound stage LSS, preferably at equal distances to each side of the center of the stage. Each microphone is normally attenuated through resistance TR1 and TR2, respectively, to ground. The attenuation of the two microphones is varied inversely by means of an oscillatory contact arm TC, which may be oscillated by means of an electric motor 30 or the like. The motor and a balancing net work for eliminating noise and for balancing the output signal are energized from a suitable power supply. As thus shown, the transmitter or recorder control unit TCU comprises the balancing net work, motor 30, and attenuating apparatus, TR1, TR2 and TC.

At the receiving or reproducing end, the control unit RCU is substantially the same as the unit TCU and comprises a power supply, a balancing network, an electric motor 30 and attenuating means for a pair of speakers S1 and S2, the attenuating means comprising grounded resistors RR1 and RR2 and an oscillating contact arm RC, which is operated by the motor 30 inversely to attenuate the speakers S1 and S2. The speakers are disposed in suitably spaced relation, preferably the same as that of the microphones M1 and M2, to define a reproduction stage RSS.

The microphones M1 and M2 and speakers S1 and S2 are disposed on the respective sound stages in much the same manner as is practiced in two channel stereophonic systems. The microphones, being directional, each perceive or pick-up one physical half of the live sound stage LSS, and when the signals emitted from the microphones M1 and M2 are recreated at the speakers S1 and S2, respectively, a substantially true binaural or stereophonic reproduction is afforded. The principles involved in the placement of the translating means to reproduce or recreate the spatial relationship of the stereophonic sound is well known in the art and need not be described in detail herein. It is in the practical accomplishment of binaural transmission via a single channel that the present invention distinguishes itself.

According to the present invention, sweeping of the sound stages is effectively accomplished with stationary translating means by normally attenuating the translating means, and unattenuating the said means one at a time in an ordered arrangement. An energized loudspeaker, for example, can be attenuated so that its output is not audible to the human ear, and audibility of the output may be varied by decreasing the degree or eliminating attenuation (in popular terms, increasing the volume). Yet, the speaker is fully energized and immediately responsive upon being unattenuated to emit an audible output. Generally, the same characteristics exist in a microphone. Upon attenuating and unattenuating the translating means, while maintaining energization, the output signal comprises a wave function having at all times less than infinite slope. By utilizing the attenuation principles as described in the immediately foregoing, the present invention affords the distinct advantages of eliminating problems that have existed in previously proposed single channel systems with respect to speed of operation, noise, E.M.F. factors, intelligibility and transmission. Considering the transmitting or recording end of the system shown in Figure 3, it is to be seen that, as one microphone is attenuated, the other is unattenuated so that the two microphones fade in and out in terms of output strength at the contact arm TC. Accordingly, microphone means are effectively swept back and forth between the two positions shown to perceive the sound components at M1 and the sound components at M2, which components then constitute an ordered arrangement comprising the microphone signal output, a single channel signal, which is tapped off the contact arm TC. The contact arm TC, of course, is oscillated at a frequency to define a signal wherein the interval between corresponding components, i.e., between alternate components in a two microphone system, is not substantially greater, and is preferably less, than the sound retention interval of the human system, and thus audibly imperceptible.

At the receiving or reproducing end of the system, the single signal output of the microphones is fed to the contact arm RC, and the contact arm RC is preferably oscillated synchronously with the contact arm TC. The signal follows the path of least resistance and thus the components of sound perceived at M1 and M2 are reproduced at S1 and S2, respectively. The attenuating control fades the speakers in and out in alternate relation in accordance with the interval between corresponding sound components, without deenergizing the speakers, to afford the defined reproduction at the sound stage RSS. In other words, while one speaker is unattenuated to emit audible sound, the other speaker is attenuated, preferably to an intensity below audible perception, so that the human system perceives the spatial relationship of the respective sound components. Since the interval between corresponding components is preferably less than the sound retention interval of the human system, the listener will perceive only a constant, simultaneous emission of the respective components, whereupon the spatial relationship of the original sound stage is imparted or reintroduced, thus affording binaural or stereophonic reproduction.

As will be appreciated by those skilled in the art from the foregoing description, the control units TCU and RCU shown in Figure 3 may comprise electronic units, including vacuum tubes as variable potentiometers or resistors, as well as the electro-mechanical units shown and described.

In further consideration of Figures 1, 2 and 3, it is to be noted that with the system of the present invention, at each point of emission on the reproduction sound stage, the complete range of the original sound stage is recreated. Also, the equipment employed at the transmitting or recording end is the same as that presently employed for monaural sound systems, plus the addition of stage sweeping microphone means and a simple control unit for causing the microphone means to sweep the sound stage. Specifically, in the preferred arrangement disclosed in theoretical aspect in Figure 3, the system is entirely conventional except for the addition of the control unit TCU, particularly the attenuating means TR1, TR2 and TC included in the unit. Normally, even in monaural broadcasts and recordings, at least two microphones are employed, and thus the present invention requires only the addition of a small attachment comprising the attenuating means. At the receiving end, most conventional receivers and reproducers are provided only with one loudspeaker. In such case, the present invention necessitates only the addition of a second speaker and the attenuation control RR1, RR2 and RC, whereby existing monaural apparatus may very readily be converted simply and economically to binaural or stereophonic reproductions of the single channel binaural signal afforded according to the invention. If such conversion is not made, programs transmitted or recorded according to the invention may be received or reproduced monaurally on conventional apparatus, the system of the present invention being entirely compatible to conventional apparatus.

Referring now to Figures 4 to 11, we have disclosed a variety of manners of carrying into practical effect the theories and purposes above defined, to afford truly practical, commercially feasible and economical methods and apparatus for the transmission, recording, reception and reproduction of binaural sound by a single channel system. The first embodiment is shown in Figure 4 as comprising the microphone and sweep control means of a transmitter or recorder, the control means, indicated generally at TCU, comprising a selsyn, servo-motor, or the like, having a delta stator winding and a rotor winding adapted to have a signal component induced therein from each leg of the delta winding. As above described, the microphone means comprises at least two spaced microphones M1 and M2, but for a delta winding as shown, a third microphone M3 may well be provided, as indicated in dotted lines. The microphones M1, M2 and M3 are connected, respectively, to the opposite ends of the three legs or windings TW1, TW2 and TW3 of the delta wound stator of the selsyn, each to impress a sound component signal in the respective winding. The rotor or armature winding TAW is carried by a rotatable shaft, rotated by independent means such as an electric motor, whereby the rotor winding rotates into proximity to each of the windings TW1, TW2 and TW3. As the rotor winding sweeps each stator winding, a signal is induced in the rotor winding to be fed to the amplifier and final unit of the system. Accordingly, the output of the rotor winding is a single channel signal comprising an ordered arrangement of signal components corresponding to the sound components at each of the microphones M1, M2 and M3. In effect then, two microphones are attenuated and one is unattenuated at any given instant of operation, whereby the signal corresponds to that described in conjunction with Figure 3. To afford the necessary interval between corresponding components, the rotor is preferably rotated at such speed as to be audibly imperceptible and to effect a complete revolution of the rotor in an interval preferably less than the sound retention interval of the human system (with the retention interval above referred to, rotation of the armature should preferably exceed 1200 r.p.m.).

In Figure 5, we have shown the translating means and sweep control means for a receiver or reproducer, the apparatus shown being particularly adapted for, but not necessarily limited to, use in conjunction with the apparatus shown in Figure 4. The apparatus of Figure 5 comprises at least two speakers S1 and S2, and a control unit RCU comprising a selsyn of the same character as that described above, the selsyn including delta stator windings, RW1, RW2 and RW3, and a rotor winding RAW. With the delta wound stator, a third speaker S3 may suitably be provided, as is indicated in dotted lines. The speakers S1, S2 and S3 are connected, respectively, to the opposite ends of the windings RW1, RW2 and RW3, and the signal input is fed to the rotor winding RAW. The rotor is rotated, suitably by an electric motor, and preferably in synchronism with the transmitter rotor. As the rotor RAW is rotated, the incoming signal components are induced, respectively, in the three stator windings and transmitted to the respective speakers for emission of the sound components of the originally perceived sound stage. As will be appreciated from the foregoing, one speaker emits audible sound while the other two speakers are attenuated to a level below perception, with audibility of emission progressing or advancing from one speaker to another in ordered arrangement. Emission of the individual sound components of the respective speakers is beyond audible perception, whereby the full sound stage is recreated at the speaker means. In both Figures 4 and 5, the translating means are normally attenuated and are unattenuated one at a time to afford the same operational characteristics as described in conjunction with Figure 3. Accordingly, it is to be appreciated that the receiver or reproducer of Figure 5 could well be employed to receive or reproduce the signal of the Figure 3 transmitter to recreate the original sound stage stereophonically.

In consideration of two and three translating means systems, such as represented in Figures 1, 3, 4 and 5, it is to be observed that in the absence of a visual portrayal of the original or live sound stage, it is not essential that perfect synchronism of the transmitter or recorder and receiver or reproducer exist, for it makes little difference to most listeners whether the woodwinds of an orchestra are perceived as being on the left or right, and the brasses as being on the right or left, so long as spatial relationship exists. Accordingly, the output of microphones M1 and M2 could well be reproduced at speakers S2 and S1, respectively, as well as at speakers S1 and S2, respectively, without loss of realism. In either case, the translating means M3 and S3 would be synchronized. However, in motion picture and television productions, synchronous operation normally is necessary. Also, in instances wherein more than three translating means are employed, synchronous operation will normally be desired. As noted hereinbefore, synchronous operation may be obtained in any desired manner.

In Figure 6, we have shown a particularly practical intensity attenuation control circuit for the single channel binaural sound transmitter or recorder of the invention. The microphone means employed may be comprised of plurality of directional microphones, or a multiple element microphone, as is represented, having a plurality of, for example five, directional elements M1, M2, M3, M4 and M5. The control circuit TCU for the microphone means is comprised of a multiple element electron tube which, in certain operational respects and in a very general sense, comprises a plurality of triodes combined to afford electron emission one by one in an ordered progressive arrangement. Tubes suitable for the purposes are the L. M. Ericson "Trochotrons" marketed by A. B. Svenska Electronror, Stockholm, Sweden. The tube represented in Figure 6 is identified by that concern as the RGY 10, which again in a general sense, defines ten triodes (only five being shown in Figure 6 for purposes of clarity). The RGY 10 apparently is satisfactory for the transmission and recording purposes of the present invention, but for receiving and reproducing, a somewhat different "Trochotron" tube, known as the AD-5 appears necessary, the latter tube being illustrated schematically in Figure 7. The "RGY 10 Trochotron" shown in Figure 6 comprises a hermetically sealed envelope 60, an axial cathode 61, a coaxial cylindrical plate 62, and a plurality of elements 63, called spades, which are arranged in circumferentially spaced relation between the cathode and plate and coaxial therewith. In the RGY 10, ten spades are actually provided, but we have herein shown only five spades, to simplify the electrical connections shown in the drawing. The cathode and plate of the tube are common to the spades, in that the tube actually comprises ten (five as shown in the drawings) three-element tube units, the three elements of each unit comprising a cathode, a plate and a spade. Upon energization, the tube automatically performs a function based upon a trochoid curve, from which function the tube draws its name. The effect of such performance is that electron emission occurs from one spade at a time to the plate in ordered arrangement circularly about the tube, the path of flow from spade to plate proceeding at a rapid rate from spade to spade about the tube, in fact, at such rate as to accommodate one million counts per second with ten spades. According to the present invention, the RGY 10 may be employed in transmitters and recorders to attenuate, at a given instant, all but one of the microphones or microphone elements, while unattenuating the said one due to emission from one spade to the plate, whereby the microphones or microphone elements may be unattenuated one at a time in ordered arrangement. As shown in Figure 6, this is accomplished by connecting one terminal of each microphone or microphone element to a spade 63, in a desired arrangement of unattenuating the microphones. As shown in Figure 5, if progressive advancement is counterclockwise around the tube, the microphones may be unattenuated in the order M1, M2, M3, M4, M5, M1, M2, etc., by connection to consecutive spades. In the case of the ten spade tube, the microphone element M1 could be connected to the first and sixth spades, element M2 to the second and seventh spades, and so on, to afford the same ordered arrangement. The signal output is taken from the plate 62, with connection through resistance to B+, the output signal line including the usual condensor. As shown, the cathode may be connected through resistance to ground. In operation then, as with the above described apparatus, a single signal output will be obtained comprising an ordered arrangement of sound components taken respectively at the microphone elements M1, M2, M3, M4 and M5, wherein the interval between corresponding components is not substantially greater, and preferably less, than the sound retention interval of the human system.

A binaural sound receiving or reproducing apparatus particularly adapted for use in conjunction with the apparatus shown in Figure 6, but not necessarily limited to such use, is shown in Figure 7 as comprising a plurality of speakers, preferably five in number, to correspond to the arrangement of Figure 6, namely speakers S1, S2, S3, S4 and S5, and a sweep control circuit RCU therefor. The control circuit or means RCU comprises, principally, the "AD 5 Trochotron" tube referred to above. This tube operates in the same manner generally as the RGY 10 tube, but differs in respect to the kind and number of components. Specifically, the tube comprises an envelope 70, an axial cathode 71, a coaxial cylindrical control grid 75, a plurality of plates 72 disposed in circumferentially spaced relation coaxial with and in radially outwardly spaced relation to the control grid, a plurality of circumferentially spaced spades 73, which are each shown as located, in electrical effect, adjacent one side of the plate 72, a plurality of by-spades 76 which are each located adjacent the opposite side of a plate 72, and a magnet 74. The cathode and grid are common to all plates, spades and by-spades, so that each operable unit in the tube comprises a cathode, a grid, a plate, a spade and a by-spade, as illustrated, and a large number of such units may be provided in a single tube. For convenience of disclosure, we have shown only five of the units, as that is all that are required to disclose an operative circuit for the five speakers. The cathode is grounded through resistance, the input signal is to the grid, and each plate is connected to a speaker. Normally, the spades, by-spades and plates are individual elements, but we contemplate in this instance connection of the spade and plate of each unit, as is indicated by the connection dot between the respective plates and spades. The output signals from each plate to the respective speakers are connected through resistance to B+, each signal line includes the usual condensor, and corresponding terminals of the speakers are commonly grounded.

Upon energization of the AD-5 tube, as will be appreciated from the foregoing description, all but one of the speakers will be attenuated at any given instant, and progressive advancement in the functioning of the tube will result in unattenuating all of the speakers one at a time in ordered arrangement. Assuming advance in a counterclockwise direction, the speakers will be unattenuated to afford audible emission one at a time in the order S1, S2, S3, S4, S5, S1, S2, etc. Accordingly, if advancement in the AD-5 tube of Figure 7 is synchronized with advancement in the RGY tube of Figure 6, the speakers will emit sound components in the proper order and at the proper intervals to recreate the original sound stage in the manner explained heretofore.

With respect to amplification, we have previously referred to a single amplifier both at the transmitting end and the receiving end of the system to amplify the single signal output and input, respectively. As will be appreciated, amplifiers could, if desired, be employed at each translating means. Also, in a circuit such as shown in Figure 7, the AD-5 tube itself may be employed for amplification. As will be appreciated by those skilled in the art, the AD-5 tube may be employed in a transmitter or recorder circuit in place of the RGY 10 tube shown in Figure 6 by interconnecting the plates 72.

In the foregoing, consideration has been given to principles of intensity attenuation in the practice of the present invention. A further feature of the invention is the attainment of attenuation to audible perception by application of the Haas effect, or in other words, the attainment of an auditory suppression effect, in terms of location, by means of time delay. In conducting investigations concerning the effects of echo on intelligibility, H. Haas found that for echo delay differences of from about .015 to about .025 second, 15 to 25 milliseconds, a remarkable phenomenon occurred. Utilizing a first loudspeaker for emission of primary or direct sound, and a second spaced loudspeaker for emission of the echo sound, Haas discovered, for echo delay differences in the interval stated, first, that no echo was separately perceived by the listener, and second, that the intensity of the echo sound, though actually equal to that of the primary sound, was suppressed to the audible perception of the listener so that all of the sound was perceived as emitting from the primary loudspeaker. While the emission from the primary speaker was somewhat more full than would normally be the case, the audible location of the echo speaker was entirely lost to the perception of the listener. In other words, the perceived location of sound was at the primary speaker. Applying this principle to the present invention, we conceived that the signal output of one microphone could be suppressed (attenuated) to audible perception by introduction of a time delay of from about .015 to about .025 second in the circuit of that microphone, so that the signal output of that microphone could not be perceived over the undelayed signal output of a second microphone. Then, by interposing delay time first in one microphone circuit and then in the other, a single signal output, comprising an ordered arrangement of the sound components at each microphone, could be obtained. Referring to Figure 8, we have shown a transmitter or recorder circuit formulated on this theory. The circuit includes at least two microphones M1 and M2, and as many additional microphones M3, etc. as may be desired. In the circuit of each microphone, means for delaying the signal output of the microphone within the range of from about .015 second to about .025 second is provided, the said means being shown herein merely by block diagram, indicated at TTD1, TTD2, TTD3, since any suitable known or proposed delaying means may be employed as desired. The microphone means must, of course, be controlled to introduce and eliminate delay time in each speaker circuit in an ordered arrangement to afford the advantages and accomplish the purposes of the present invention. To control the time delay devices TTD1, TTD2, a "Trochotron" tube, such as the RGY 10, may be employed, the control being such as to introduce delay time alternately in the circuits of the microphones M1 and M2. In installations wherein more than two microphones are employed, the circuit must be such as to introduce delay time in the circuit of all but one of the microphones at any given instant, with progressive elimination of delay time in each circuit one at a time. As will be appreciated from Figure 6, the "RGY 10 trochotron" is well suited for such purpose. In Figure 8, we have shown the RGY 10 tube as provided with only six spades 63 to simplify the wiring connections, but at the same time to show multiple spade connection to each microphone circuit. As shown, for a two-microphone circuit, alternate spades 63 are connected to each time delay unit TTD1 and TTD2 alternately to eliminate or introduce delay time in the respective circuits. In this circuit, the "Trochotron" is not employed as a combined attenuating and control device, but purely as a control device for performing a switching function. However, the "Trochotron" accommodates continuous energization of all microphones, and controls only the introduction and elimination of delay time in each microphone signal output. By this arrangement, as will be appreciated, particularly from the foregoing, a single signal output is obtained comprising an ordered arrangement of sound components, wherein the interval between corresponding components is less than the retentive interval of the human system.

Referring now to Figure 9, we have shown receiving or reproducing apparatus particularly adapted for use in conjunction with the transmitting or recording apparatus of Figure 8. This apparatus comprises control means in the form of an "AD-5 Trochotron," the plate and spade of each unit of which are inter-connected and connected in turn to a time delay unit RTD. The apparatus preferably includes the same number of speakers S1, S2, S3, etc. as are provided in the transmitting or recording apparatus, and a time delay unit RTD1, RTD2, RTD3, etc. is provided for each speaker. As shown in solid lines, in correspondence with Figure 8, alternate units in the tube have the plates 72 thereof connected to the time delay units RTD1 and RTD2. With the tubes of Figures 8 and 9 operating synchronously, it is to be appreciated that the signal transmitted or recorded will be received or reproduced at the apparatus shown in Figure 9 and broken down thereby into its components, for reproduction of corresponding components at the respective speakers, thus to recreate, to complete binaural perception, the original sound stage.

From the foregoing, it is to be appreciated that in most instances we prefer to employ, but do not necessarily employ, similar control means and the same number of translating means at both the transmitting or recording and receiving or reproducing ends of the binaural sound system of the present invention. For this reason, we have shown in Figures 10 and 11 apparatus suitable for either transmitting or receiving, the translating means represented in the figures being either microphones or speakers. In both instances, the apparatus may be operated either on the intensity or the time delay attenuating principles previously described. The apparatus disclosed in Figure 10 utilizes controlled inductance for the attenuating means and comprises at least two translating means MS1 and MS2, a controllable inductance CI1 and CI2, respectively, for each translating means, and a simple control device CD for performing a switching function to energize the inductances in ordered arrangement, alternately in the circuit shown. The control device CD may comprise a conventional flip-flop circuit, a multivibrator, a "Trochotron" tube, or the like. As will be appreciated by those skilled in the art, alternate energization of the inductances CI1 and CI2 will result in alternate attenuation, by either of the principles above referred to, of the translating means MS1 and MS2 to afford, in accordance with the foregoing, a single channel binaural signal output for a transmitter, or a binaural signal component dividing means for a receiver. Controlled inductances are desirable to accommodate levelling of the translating means and adjustment of the degree of attenuation.

In the apparatus of Figure 11, we employ saturable transformer or reactor units, suitably toroid core-type saturable core transformers, as a control means of the invention. We have shown such means as controlling four translating means, MS1, MS2, MS3 and MS4, to exemplify the simplicity with which the present invention affords a single channel binaural system for the transmission, recording, reception and reproduction of the complete sound of a sound stage to the most exacting degree possible, yet with a minimum of equipment and all via a single channel. Energization of the saturable core transformers is adapted to be controlled according to the invention by control devices CD1 and CD2 in the form of multi-vibrators or the like. If only two translating means were involved, only a single multivibrator and two transformers would be required, the resultant arrangement being the same as that illustrated in Figure 10. However, we have shown four translating means that are required to be rendered operative one at a time, and since a multivibrator has only two channels of control, it is apparent that a single multi-vibrator could not effect the necessary control. Accordingly, we employ two control devices CD1 and CD2 for effecting a two stage control, as will be made apparent. In the first stage control, four saturable core transformers, T1-1, T1-2, T1-3 and T1-4, are provided, one in the circuit of each of the translating means. Each transformer includes a core saturating winding, shown at the top, and the usual primary and secondary windings. Transformers T1-1 and T1-3 have the saturating windings thereof connected to one side, the right side, of the multi-vibrator or control device CD1, transformers T1-2 and T1-4 have their saturating windings connected to the other side, the left side, of the control device CD1, and the primary winding of each transformer is connected to the respective translating means. In the second stage control, two saturable core transformers T2-1 and T2-2 are provided in conjunction with the control device or multi-vibrator CD2, the saturating winding of the two transformers being connected, respectively, to the right and left sides of the multi-vibrator. The secondary windings of the first stage transformers T1-1 and T1-4 are connected in series with one another and with the primary winding of the second stage transformer T2-1. The secondary windings of the first stage transformers T1-2 and T1-3 are connected in series with one another and with the primary winding of the second stage transformer T2-2. The secondary windings of the second stage transformers are also connected in series, with the output therefrom, or input thereto, comprising the single channel binaural signal afforded according to the system of the present invention.

Assuming for the moment that the translating means MS1, MS2, MS3, and MS4 are microphones, operation of the apparatus shown in Figure 11 is as follows: the multi-vibrators or control devices CD1 and CD2 are identical and have the same operating characteristics and intervals as one another, but, according to the invention, are operated 90° out of phase. With the right hand side of each passing current, it is to be seen in the first stage that the cores of the transformers T1-1 and T1-3 are saturated and thus non-transmitting, to prevent signal transmission from the microphones MS1 and MS3. Transformers T1-2 and T1-4, not being saturated, accommodate transmission from the microphones MS2 and MS4 to the second stage transformers T2-2 and T2-1, respectively. However, in the second stage, the transformer T2-1 is saturated, thus preventing transmission of the signal from microphone MS4, but transformer T2-2 is not saturated so that the same transmits the signal from microphone MS2, whereby the sound component received by the microphone MS2 is the sole signal output of the apparatus. In the next interval of time, due to the phase relationship of the multi-vibrators, the right side of the control device CD1 continues to pass current, but the left side of the control device CD2 now passes current, whereupon the transformer T2-1 is deenergized and the transformer T2-2 is saturated. With this arrangement, the only signal that can flow is from microphone MS4 as transmitted by the non-saturated transformers T1-4 and T2-1. In the next interval of time, the current passed through the multi-vibrator CD1 and is reversed to render the transformers T1-1 and T1-3 operative and to saturate the transformers T1-2 and T1-4. During this interval, transformers T1-2, T1-4 and T2-2 prevent transmission from microphones MS2, MS4 and MS3 respectively, whereupon the sole signal output is that of the microphone MS1. In the next interval, the multi-vibrator CD2 again reverses, whereupon the transformer T2-1 prevents transmission from MS1 and the transformer T2-2 effects transmission from the microphone MS3. In the next interval, the control device CD1 reverses to return to the original set-up. Accordingly, the output of the apparatus comprises an ordered arrangement of sound components, in the order MS2, MS4, MS1, MS3, MS2, MS4, etc., which is particularly desirable, to afford the single channel binaural signal explained heretofore.

From the foregoing, it is to be appreciated that the present invention affords truly practical, commercially feasible and highly economical methods and apparatus providing an improved and practical single channel binaural sound system that is full compatible with the existing monaural equipment. Conversion of existing equipment to the transmission, recording, reception and reproduction of binaural sound is accomplished by the simple expediency of an attachment device or control unit, and, where necessary, additional translating means. The entire system is most economical in that the same requires only a single channel and employs standard, existing equipment except for the attachment device referred to. In addition to the methods and apparatus referred to specifically hereinbefore, the invention further provides novel records or recordings comprising a conventional carrier, such as wax, tape, wire, or film, bearing the distinctive single channel binaural signal of the invention.

While we have described what we regard to be preferred embodiments of our invention, it will be appreciated that various changes, rearrangements, and modifications may be made therein without departing from the scope of the invention, as defined by the appended claim.

We claim:

Single channel stereophonic sound apparatus comprising a plurality of translating means disposed in spaced relation on a sound stage, means normally introducing a time delay of from about .015 to about .025 second in the signal at each of said translating means and control means for selectively eliminating the signal time delay at one and then another of said translating means one at a time in ordered arrangement at a frequency outside human audible perception, whereby at any given instant all but one of said translating means are attenuated to human audible perception and whereby the translating means are rendered audibly perceptible to a human one at a time in said ordered arrangement.

References Cited in the file of this patent

UNITED STATES PATENTS

| | | |
|---|---|---|
| 745,734 | Miner | Dec. 1, 1903 |
| 1,624,486 | Fletcher et al. | Apr. 12, 1927 |
| 2,298,618 | Garity et al. | Oct. 13, 1942 |
| 2,714,633 | Fine | Aug. 2, 1955 |
| 2,792,449 | Bottini | May 14, 1957 |